(12) United States Patent
Orihara

(10) Patent No.: US 10,936,931 B2
(45) Date of Patent: *Mar. 2, 2021

(54) ANTENNA DEVICE

(71) Applicant: DEXERIALS CORPORATION, Tokyo (JP)

(72) Inventor: Katsuhisa Orihara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/745,907

(22) PCT Filed: Jun. 28, 2016

(86) PCT No.: PCT/JP2016/069101
§ 371 (c)(1),
(2) Date: Jan. 18, 2018

(87) PCT Pub. No.: WO2017/014009
PCT Pub. Date: Jan. 26, 2017

(65) Prior Publication Data
US 2018/0211148 A1  Jul. 26, 2018

(30) Foreign Application Priority Data
Jul. 22, 2015  (JP) .............................. JP2015-144700

(51) Int. Cl.
*H01Q 7/00* (2006.01)
*G06K 19/077* (2006.01)
*H01Q 1/22* (2006.01)

(52) U.S. Cl.
CPC ..... *G06K 19/07773* (2013.01); *G06K 19/077* (2013.01); *H01Q 1/2216* (2013.01); *H01Q 1/2225* (2013.01); *H01Q 7/00* (2013.01)

(58) Field of Classification Search
CPC .......... H01Q 1/243; H01Q 7/00; H01Q 7/005; H01Q 7/02; H01Q 7/04; H01Q 7/06; H01Q 7/08
See application file for complete search history.

(56) References Cited

U.S. PATENT DOCUMENTS

2011/0050164 A1*  3/2011  Partovi ................... H01F 5/003
                                                     320/108
2013/0307746 A1*  11/2013  Nakano ................ H01Q 1/2225
                                                     343/850

(Continued)

FOREIGN PATENT DOCUMENTS

CN         104638342 A      5/2015
CN         204315730 U      5/2015

(Continued)

OTHER PUBLICATIONS

Aug. 9, 2016 Search Report issued in International Patent Application No. PCT/JP2016/069101.

(Continued)

*Primary Examiner* — Daniel Munoz
(74) *Attorney, Agent, or Firm* — Oliff PLC

(57) ABSTRACT

An antenna device having excellent communication characteristics even when no opening is provided in a conductor. An antenna device including: an antenna coil inductively coupled to an external device (reader/writer) and provided by winding around a conducting wire two dimensionally via an opening; and a conductor provided to be overlapped with the antenna coil at a surface of the antenna coil opposing to the external device, wherein the conductor includes a first slit formed from a region overlapped with the opening of the antenna coil to an end of the conductor, and a second slit connected to the first slit and formed in the region overlapped with the opening of the antenna coil.

3 Claims, 8 Drawing Sheets

(56) References Cited

U.S. PATENT DOCUMENTS

| | | | | |
|---|---|---|---|---|
| 2014/0091758 A1* | 4/2014 | Hidaka | ................... | H01F 38/14 |
| | | | | 320/108 |
| 2015/0076922 A1* | 3/2015 | Kato | ....................... | H04W 4/80 |
| | | | | 307/104 |
| 2015/0256228 A1 | 9/2015 | Goma et al. | | |
| 2016/0315373 A1* | 10/2016 | Azad | ..................... | H01Q 1/243 |

FOREIGN PATENT DOCUMENTS

| | | | |
|---|---|---|---|
| JP | 2006-270681 | A | 10/2006 |
| JP | 2008-131115 | A | 6/2008 |
| JP | 4687832 | B2 | 2/2011 |
| JP | 2014075775 | A | 4/2014 |
| JP | 2015-95707 | A | 5/2015 |
| WO | 2014/112150 | A1 | 7/2014 |

OTHER PUBLICATIONS

May 21, 2019 Office Action issued in Chinese Patent Application No. 201680040626.2.

Oct. 21, 2019 Office Action issued in Chinese Patent Application No. 201680040626.2.

Jan. 22, 2020 Office Action issued in Chinese Patent Application No. 201680040626.2.

\* cited by examiner

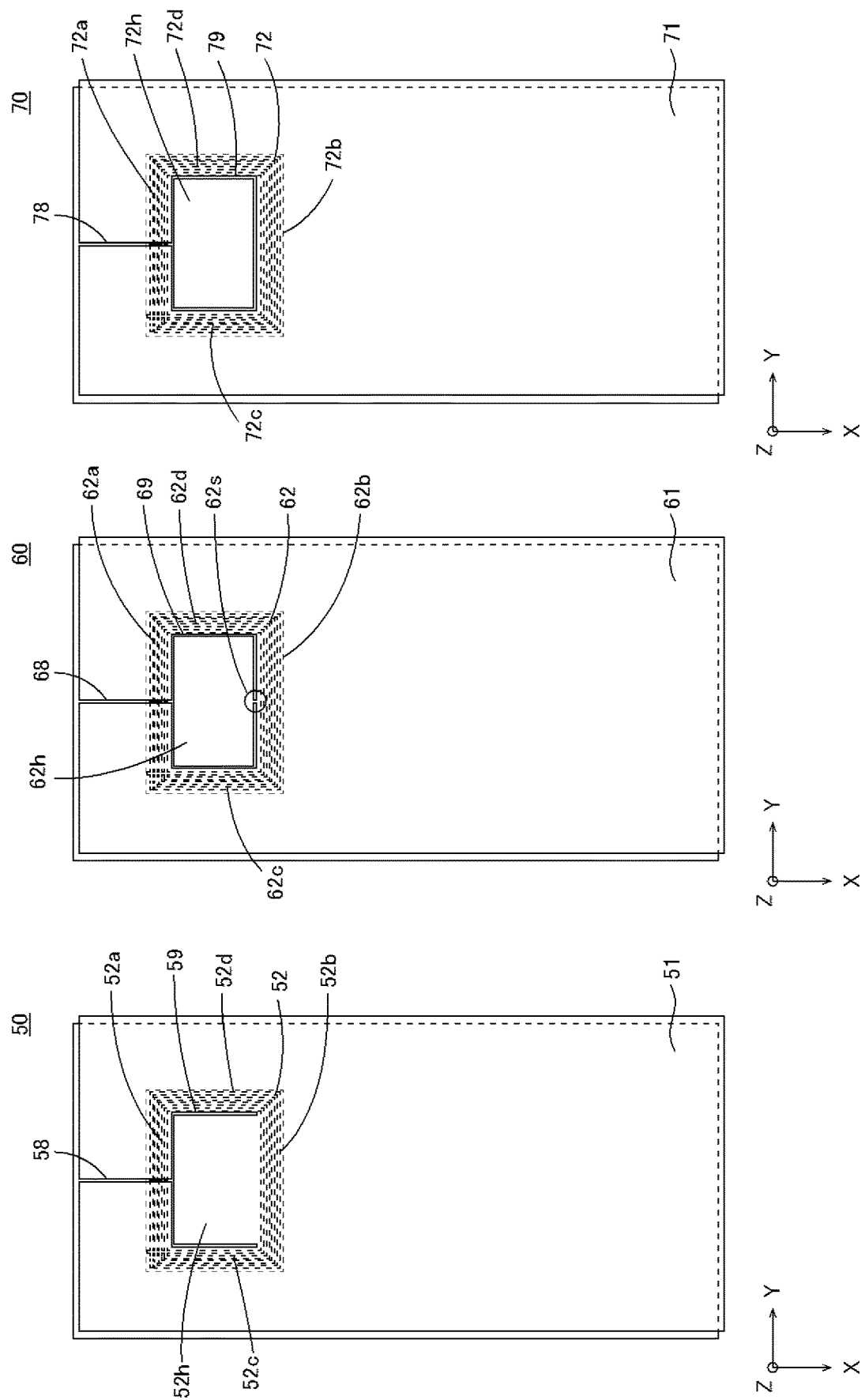

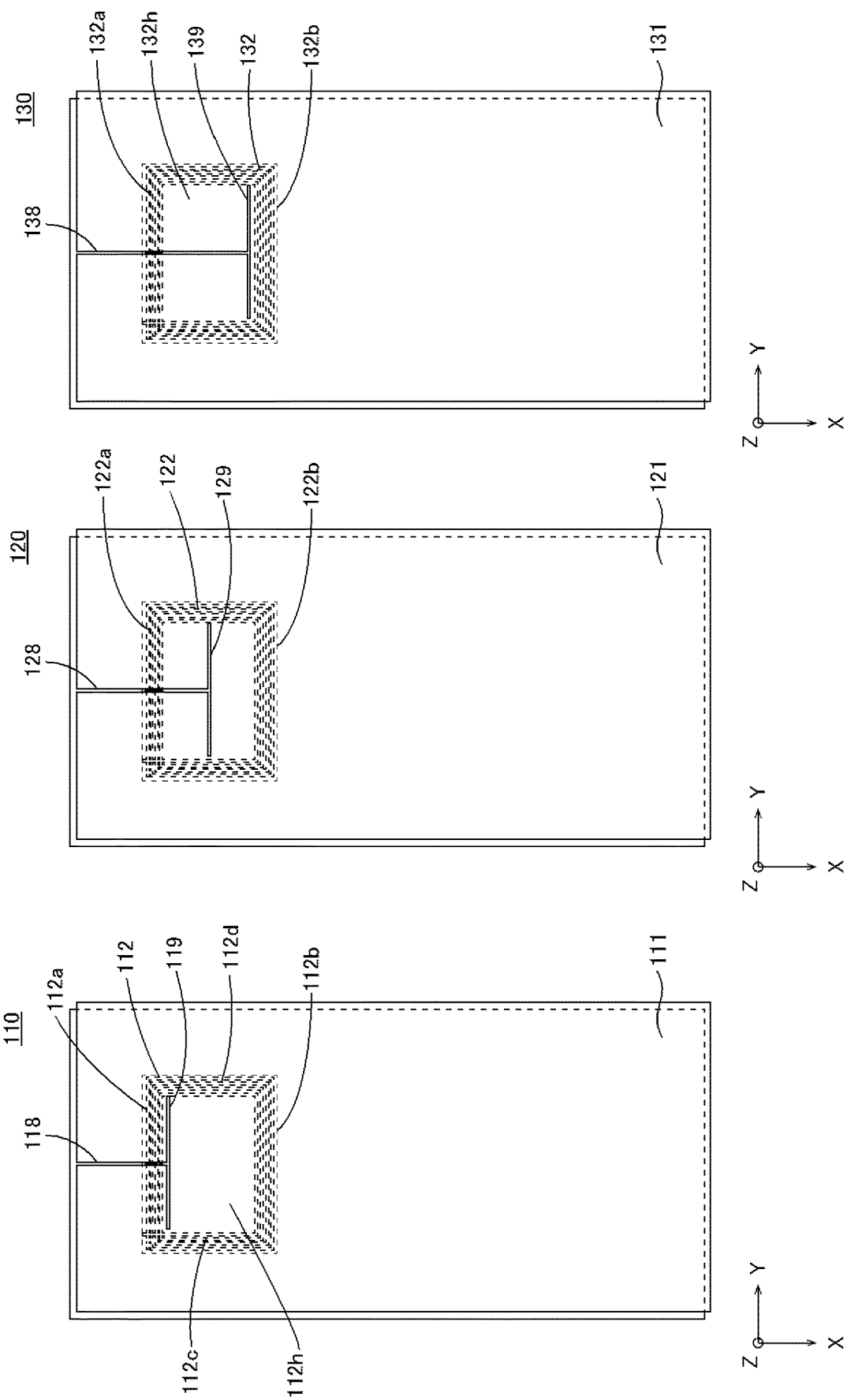

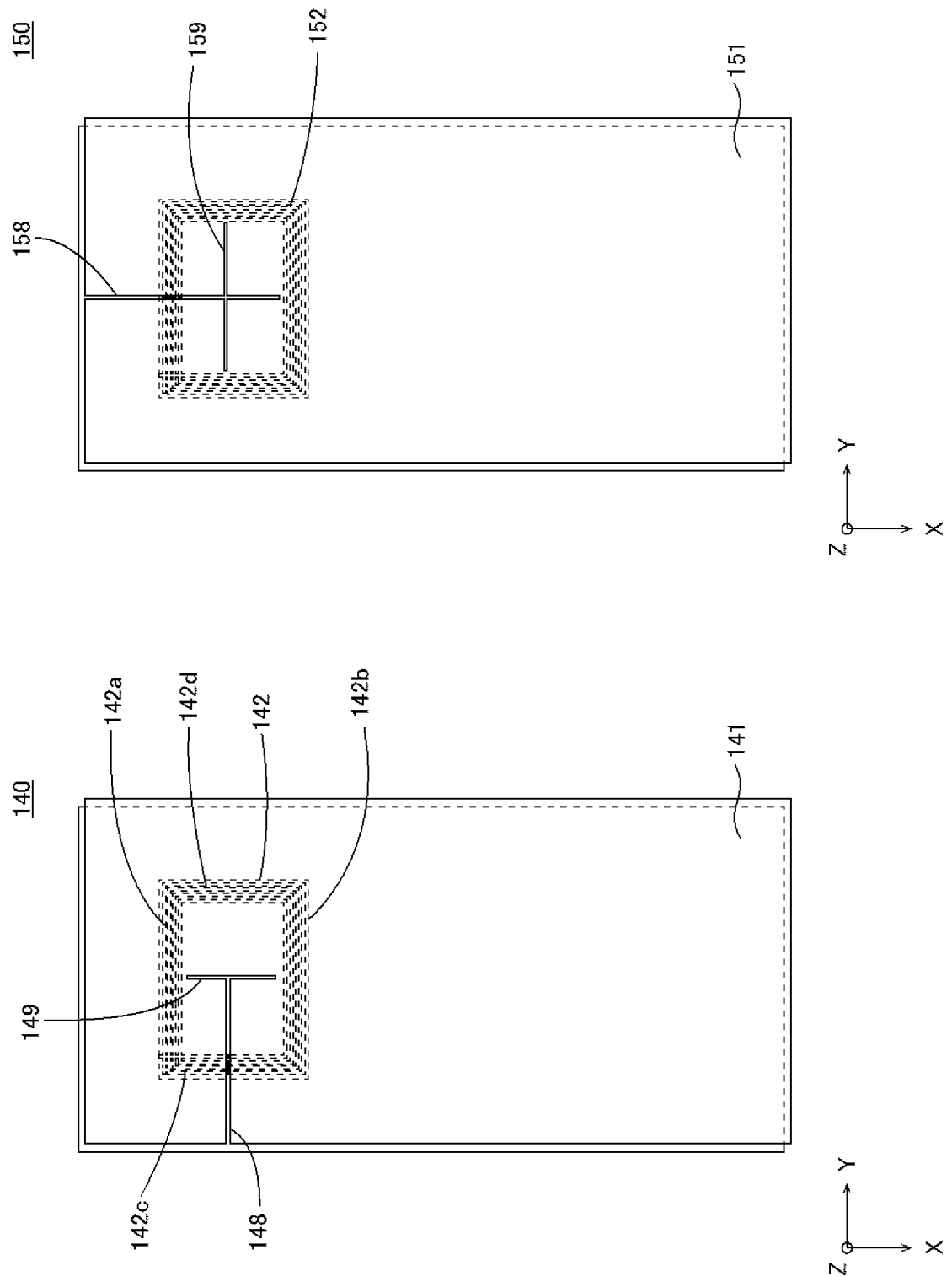

ANTENNA DEVICE

BACKGROUND OF THE INVENTION

Field of the Invention

The present invention relates to an antenna device incorporated in an electronic apparatus and communicating with an external device such as a transmitter via an electromagnetic field signal. The present application claims priority based on Japanese Patent Application No. 2015-144700 filed in Japan on Jul. 22, 2015, which is incorporated by reference herein.

Description of Related Art

In electronic apparatuses such as portable telephone, an antenna module for RFID (Radio Frequency Identification) has been used to mount a function of Near Field Communication. This antenna module communicates with an antenna coil mounted on a transmitter such as a reader/writer by using inductive coupling. That is, in this antenna module, a magnetic field from the reader/writer is received by an antenna coil and thereby converted into electric power, which can drive an IC which functions as a communication processing unit.

To reliably perform communication, the antenna module is required to receive, at the antenna coil, magnetic flux equal to or more than a certain value from the reader/writer. For this reason, in an antenna module according to a conventional example, a loop coil is provided in a housing of a portable telephone or the like, and this coil receives magnetic flux from the reader/writer. In the antenna module incorporated in an electronic apparatus such as a portable telephone, magnetic flux from the reader/writer are caused to bounce back by eddy current occurring because the metal of a substrate, a battery pack, or the like inside the apparatus receives a magnetic field from the reader/writer. For example, when considering with a housing surface of the portable telephone, the magnetic field coming from the reader/writer tends to be strong at an outer circumferential portion of the housing surface and weak at a portion near the center of the housing surface.

For an antenna using a normal loop coil, the loop coil has an opening which is positioned at a center portion of the portable telephone where a magnetic field passing through the above-described outer circumferential portion of the housing surface is not much received. Thus, in the antenna using the normal loop coil, efficiency of receiving magnetic field is poor.

For example, in Patent Literature 1, a portable equipment incorporating an antenna coil inside a housing, in which the antenna coil communicates by receiving electromagnetic wave of certain wavelength emitted from an external antenna, wherein failure of communication when the external antenna and the antenna coil inside the housing are adjacent to each other is inhibited, by providing a metallic layer at incident side of electromagnetic wave from communication face of the antenna coil, is described.

In addition, in Patent Literature 2, an antenna device incorporated in an electronic apparatus and communicating with an external device via an electromagnetic field signal, comprising an antenna coil positioned at an end of an opening provided at a cover, which is having a magnetic shield function of the electronic apparatus, to be disposed on an inner wall surface of the cover, is described.

In addition, in Patent Literature 3, an antenna device comprising a coil conductor in a shape of loop or spiral having coil opening at a center of winding, and a conductor layer arranged at a side proximate to an antenna of communication partner from the coil conductor, wherein the conductor layer comprises a conductor opening, and a slit connecting between the conductor opening and an outer edge, wherein the coil conductor and the conductor layer are overlapped in planar view of the coil conductor, is described.

Patent Literature 1: JP 2006-270681 A
Patent Literature 2: JP 2015-95707 A
Patent Literature 3: JP 4687832 B

SUMMARY OF THE INVENTION

For example, it was necessary to provide an opening at a metallic cover, in order to operate NFC antenna under the metallic cover, which bounces back magnetic flux from a reader/writer. However, by providing the opening at the metallic cover, there were problems such as decrease of strength of the metallic cover and limitation in design.

In Patent Literature 1, the portable equipment, in which the antenna coil and the metallic layer are partially overlapped, is described, but it is not described about the portable equipment in which whole antenna coil is overlapped with the metallic layer.

In Patent Literature 2, it is described that the antenna coil is positioned at the end of the opening provided at the cover, which is having a magnetic shield function, but it is not described about an embodiment without an opening.

In Patent Literature 3, the antenna device, in which a coil opening and a conductor opening are at least partially overlapped, is described, but it is not described about an embodiment without an opening.

The present invention is proposed considering these circumstances, and the present invention provides an antenna device having excellent communication characteristics even when no opening is provided in a conductor.

One embodiment of the present invention is an antenna device incorporated in an electronic apparatus and communicating with an external device via an electromagnetic field signal, comprising: an antenna coil inductively coupled to the external device and provided by winding around a conducting wire two dimensionally via an opening; and a conductor provided to be overlapped with the antenna coil at a surface of the antenna coil opposing to the external device, wherein the conductor comprises a first slit formed from a region overlapped with the opening of the antenna coil to an end of the conductor, and a second slit connected to the first slit and formed in the region overlapped with the opening of the antenna coil.

According to one embodiment of the present invention, by comprising the second slit in the region of the conductor overlapped with the opening of the antenna coil, magnetic flux passes through in the slit, and it is having excellent communication characteristics even when no opening is provided in the conductor.

At this time, in one embodiment of the present invention, the second slit may be formed from a plurality of slits.

By forming the second slit with a plurality of slits, a number of magnetic flux, which passes through, increases and communication characteristics will be improved.

In addition, at this time, in one embodiment of the present invention, the second slit may be formed along inner shape of the antenna coil.

By forming the second slit along inner shape of the antenna coil, magnetic flux passes through the slit formed along the opening, so it will be having excellent communication characteristics.

In addition, in one embodiment of the present invention, the opening of the antenna coil is rectangular shape, and the second slit may be formed along three sides of inner shape of the antenna coil.

By forming the second slit along three sides of inner shape of rectangular antenna coil, it is possible to obtain communication characteristics almost same as communication characteristics when the opening is provided in the conductor.

In addition, in one embodiment of the present invention, the opening of the antenna coil is rectangular shape, and the second slit may be formed along four sides of inner shape of the antenna coil.

By forming the second slit along four sides of inner shape of rectangular antenna coil, it is possible to obtain more excellent communication characteristics than communication characteristics when the opening is provided in the conductor.

According to the present invention, it is possible to provide the antenna device having excellent communication characteristics same as or more than communication characteristics when the opening is formed, even when no opening is provided in the conductor, by providing the second slit at a region of the conductor overlapped with the opening of the antenna coil.

BRIEF DESCRIPTION OF THE DRAWINGS

FIGS. 3A, 3B and 3C are plan views for explaining an arrangement of the second slit in the antenna device relating to one embodiment of the present invention.

FIGS. 4A, 4B and 4C are plan views for explaining an arrangement of the second slit in the antenna device relating to one embodiment of the present invention.

FIGS. 5A and 5B are plan views for explaining an arrangement of the second slit in the antenna device relating to one embodiment of the present invention.

DETAILED DESCRIPTION OF THE INVENTION

Hereinafter, explaining in detail about preferred embodiments of the present invention. In addition, the embodiments explained in below will not unjustly limit the content of the present invention described in claims, and it is not limited that all the structures explained in the embodiments are necessary as means for solving the problem of the present invention.

Figure 1:
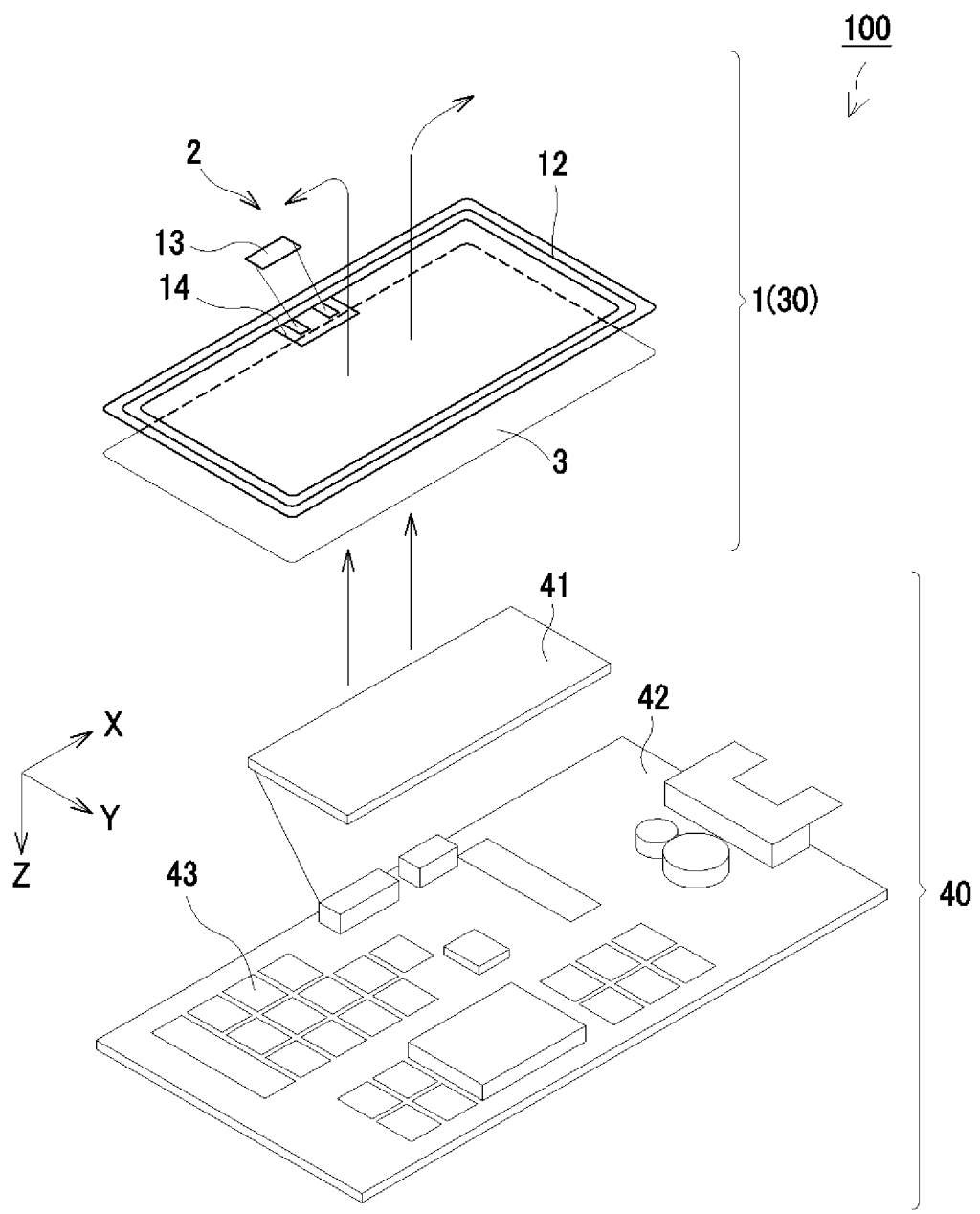
FIG. 1 is a perspective view illustrating a schematic structure of a wireless communication system applying an antenna device relating to one embodiment of the present invention.
Figure 2A:
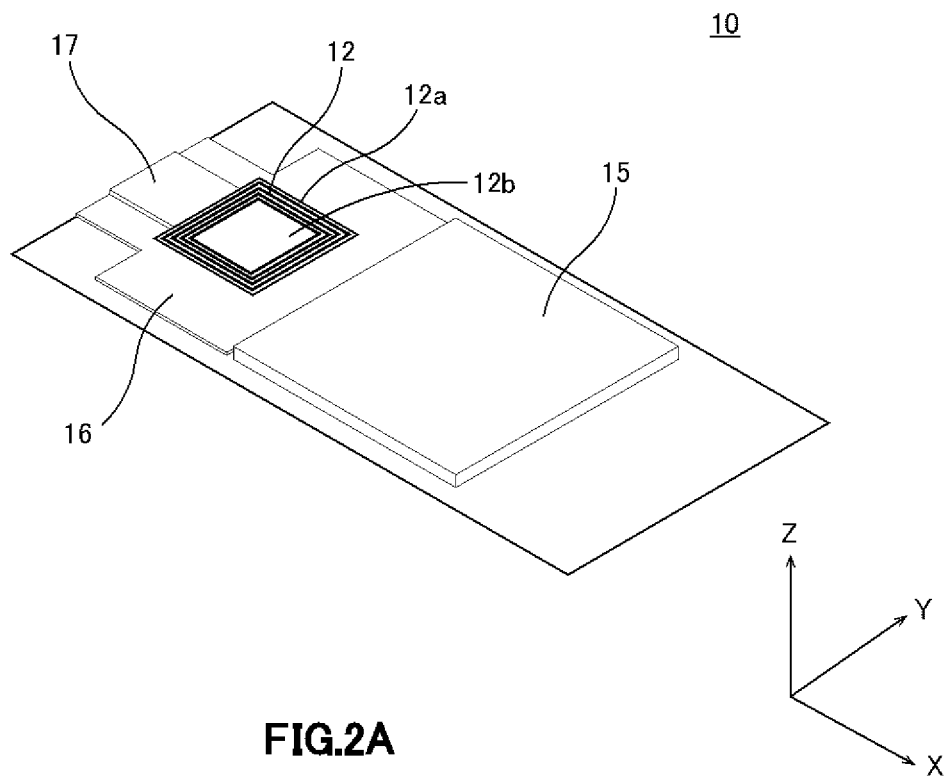
FIG. 2A is a perspective view illustrating an example of inside of an electronic apparatus comprising the antenna device relating to one embodiment of the present invention.
Figure 2B:
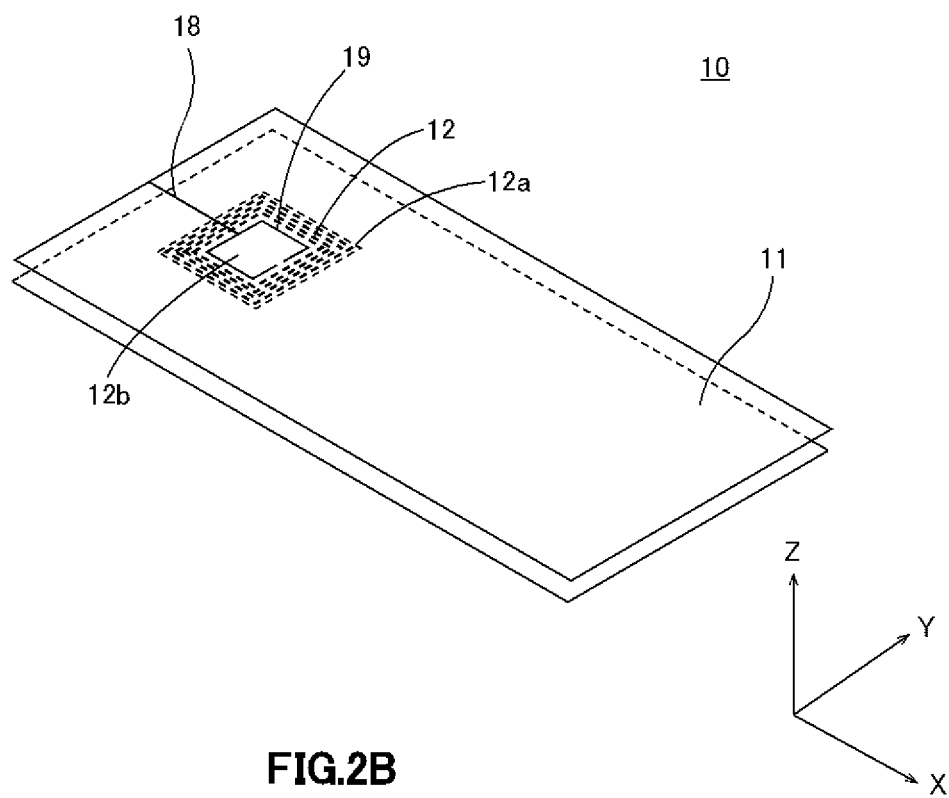
FIG. 2B is a perspective view for explaining an arrangement of an antenna coil and first and second slits formed in a conductor (metallic cover) of the antenna device relating to one embodiment of the present invention.

At first, explaining about a structure of an antenna device relating to one embodiment of the present invention, using the drawings. FIG. 1 is a perspective view illustrating a schematic structure of a wireless communication system applying an antenna device relating to one embodiment of the present invention, FIG. 2A is a perspective view illustrating an example of inside of an electronic apparatus comprising the antenna device relating to one embodiment of the present invention, and FIG. 2B is a perspective view for explaining an arrangement of an antenna coil and first and second slits formed in a conductor (metallic cover) of the antenna device relating to one embodiment of the present invention.

An antenna device 1 relating to this embodiment is a device incorporated in an electronic apparatus 30 and communicating with an external device via electromagnetic field signal, and for example, it is used by incorporated in a wireless communication system 100 for RFID as illustrated in FIG. 1.

As illustrated in FIG. 1, the wireless communication system 100 comprises: the antenna device 1 provided in the electronic apparatus 30; and a reader/writer 40 which is the external device for accessing to the antenna device 1. Here, the antenna device 1 and the reader/writer 40 are arranged to be opposed to each other in XY plane of three-dimensional orthogonal coordinate system XYZ illustrated in FIG. 1.

The reader/writer 40 functions as a transmitter for transmitting magnetic field in Z axis direction with respect to the antenna device 1 opposing to each other in XY plane, concretely, the reader/writer 40 comprises: an antenna 41 for transmitting magnetic field to the antenna device 1; and a control board 42 for communicating with the antenna device 1 inductively coupled via the antenna 41.

In other words, in the reader/writer 40, the control board 42 electrically connected to the antenna 41 is arranged. In this control board 42, a control circuit 43 consisting of electronic components such as one or plurality of integrated circuit chips is mounted. This control circuit 43 performs various processing based on data received from the antenna device 1.

For example, when transmitting data to the antenna device 1, the control circuit 43 encodes data, modulates carrier wave of a predetermined frequency (for example, 13.56 MHz) based on encoded data, amplifies modulated modulation signal, and drives the antenna 41 by amplified modulation signal. In addition, when reading out data from the antenna device 1, the control circuit 43 amplifies modulation signal of data received by the antenna 41, demodulates amplified modulation signal of data, and decodes demodulated data.

In addition, in the control circuit 43, an encoding system and a modulating system used in general reader/writer are used, and for example, Manchester encoding system and ASK (Amplitude Shift Keying) modulating system are used. In addition, it is explained about the antenna device or the like in a contactless communication system in below, but same applies to a contactless charging system such as Qi.

For example, the antenna device 1 is incorporated inside of a housing of the electronic apparatus 30 such as portable telephone arranged to be opposed to the reader/writer 40 in XY plane. In this embodiment, the antenna device 1 comprises: an antenna module 2 having an antenna substrate 3 mounted with an antenna coil 12 capable of communicating with inductively coupled reader/writer 40; a communication processing unit 13 driven by current flowing in the antenna coil 12 for communicating with the reader/writer 40; and a conductor, for example consisting of metal or the like as the housing.

The antenna module 2 is arranged inside of the housing (conductor) of the electronic apparatus 30, and communicates with inductively coupled reader/writer 40. As illustrated in FIG. 2A, in this embodiment, the antenna module 2 is used in a portable terminal 10 or the like comprising a conductor 11, an antenna coil 12, a battery pack 15, a printed circuit board 16, and a SIM slot 17.

In the antenna substrate 3, for example, the antenna coil 12 formed by patterning processing a flexible conducting wire 12a such as a flexible printed circuit, and a terminal area 14 for electrically connecting the antenna coil 12 and the communication processing unit 13, are mounted.

The antenna coil 12 will be magnetically coupled with the reader/writer 40 by inductive coupling when receiving magnetic field transmitted from the reader/writer 40, and the antenna coil 12 is having a function to receive modulated electromagnetic wave and to supply received signal to the communication processing unit 13 via the terminal area 14. The antenna coil 12 is, for example in approximately rectangular shape as illustrated in FIG. 2A, and one conducting wire 12a of the antenna coil 12 is wound around along outer shape, and its center side is being an opening 12b. In other words, the antenna coil 12 is provided by winding around the conducting wire 12a two dimensionally via the opening 12b. In addition, the antenna coil 12 is arranged such that a main surface on which the conducting wire 12a is wound around will be opposed to the reader/writer 40 in XY plane illustrated in FIG. 1 at the time of communication.

The communication processing unit 13 is driven by current flowing in the antenna coil 12 and communicates with the reader/writer 40. Concretely, the communication processing unit 13 demodulates received modulation signal, decodes demodulated data, and writes decoded data into internal memory incorporated in the communication processing unit 13. In addition, the communication processing unit 13 reads out data to be transmitted to the reader/writer 40 from the internal memory, encodes read out data, modulates carrier wave based on encoded data, and transmits modulated electric wave to the reader/writer 40 via the antenna coil 12 magnetically coupled by inductive coupling. In addition, the communication processing unit 13 may be driven by electric power supplied from power supplying means such as external power supply or battery pack incorporated in the electronic apparatus, instead of electric power flowing in the antenna coil 12.

The conductor 11 is provided, for example as a metallic cover, which is the housing of the electronic apparatus 30, and becomes a first conductor opposing to the reader/writer 40, which is the external device. The other conductor is provided, for example as the battery pack 15, in the housing of the electronic apparatus such as portable telephone or smart phone, or tablet PC, and configures a second conductor opposing to the reader/writer 40 at the time of communication of the antenna module 2. As such, the conductor is used, for example as a metallic cover attached to inner surface of housing of smart phone, a metal housing of battery pack contained in smart phone, a metal plate arranged at back surface of liquid crystal module of tablet PC, or the like.

The conductor 11 flows electricity relatively well, so eddy current occurs when AC magnetic field is applied from outside and magnetic field will be bounced back. There are prior arts to improve communication characteristics by arranging an antenna device at an end of second conductor such as the battery pack 15 provided inside of housing.

However, when providing the conductor 11 as a metallic cover to the housing of the electronic apparatus 30, there are conventional examples to provide an opening in the conductor 11 (metallic cover), but by providing the opening in the conductor 11 (metallic cover), problems arose such as decrease of strength of the conductor 11 (metallic cover) and limitation in design.

Here, as illustrated in FIG. 2B, the antenna device 10 relating to this embodiment comprises: the antenna coil 12 inductively coupled to the external device (reader/writer) 40 and provided by winding around a conducting wire two dimensionally via the opening 12b; and the conductor 11 provided to be overlapped with the antenna coil 12 at a surface of the antenna coil 12 opposing to the external device 40, wherein the conductor 11 comprises a first slit 18 formed from a region overlapped with the opening 12b of the antenna coil 12 to an end of the conductor 11, and a second slit 19 connected to the first slit 18 and formed in the region overlapped with the opening 12b of the antenna coil 12, in order to solve the above problems.

As such, magnetic flux passes through the second slit 19, by having the second slit 19 in the region of the conductor 11 overlapped with the opening 12b of the antenna coil 12, and it is possible to obtain the antenna device 10 having excellent communication characteristics even when no opening is provided in the conductor 11.

For example, the conductor 11 is a metallic cover of a portable terminal or the like. In a case of metal, type of metal is not limited particularly. The conductor 11 is provided to be overlapped with the antenna coil 12 at a surface of the antenna coil 12 opposing to the external device 40.

The first slit 18 is a slit formed to be reached to the end of the conductor 11 from the region overlapped with the opening 12b of the antenna coil 12. By providing the first slit 18, it is possible to prevent occurrence of eddy current, by cutting off a loop of eddy current flowing in the conductor 11 at the time of communication, and it is possible to inhibit a loss of magnetic flux passing through. It is fine as long as it is possible to prevent occurrence of eddy current, so a width of the first slit 18 is not limited particularly.

The second slit 19 is connected to the first slit 18 and formed in the region overlapped with the opening 12b of the antenna coil 12. In this way, it is possible to communicate with the external device 40, even when the antenna coil 12 is arranged to be overlapped with the conductor 11 such as the metallic cover. A width of the second slit 19 is also not limited particularly as long as it is a width capable of communicating with the external device 40. In below, explaining about a form and structure of the second slit 19 by citing few embodiments.

FIGS. 3A to 3C, FIGS. 4A to 4C, FIGS. 5A and 5B are plan views for explaining an arrangement of the second slit in the antenna device relating to one embodiment of the present invention. In addition, as illustrated conveniently in FIG. 3A, an antenna coil 52 is illustrated by separating into an upper side 52a, a lower side 52b, a left side 52c, a right side 52d and an opening 52h, in order to explain an arrangement of a second slit.

As illustrated in FIG. 3A, in an antenna device 50 relating to one embodiment of the present invention, a second slit 59 is formed along three sides of inner shape of the antenna coil 52 in approximately rectangular shape. For example, as illustrated in FIG. 3A, the second slit 59 is formed along the upper side 52a, the left side 52c and the right side 52d of the antenna coil 52. By forming the second slit 59 along three sides of inner shape of the opening 52h of the antenna coil 52 as the above, as illustrated in following examples, it is possible to obtain communication characteristics almost equal to communication characteristics when a circular opening is provided in a conductor (refer to FIG. 6C). Therefore, in the antenna device 50 relating to one embodiment of the present invention, it is possible to obtain sufficient communication characteristics even when no opening is provided in the conductor, and also, it is possible to configure the excellent antenna device 50 from a point of view of design and strength.

Further, as illustrated in FIG. 3B, in an antenna device 60 relating to one embodiment of the present invention, a second slit 69 is formed along four sides of inner shape of an antenna coil 62. In other words, as illustrated in FIG. 3B, the second slit 69 is formed along four sides of an upper side 62a, a lower side 62b, a left side 62c and a right side 62d of the antenna coil 62. In addition, at this time, among slit of four sides, in one side (in FIG. 3B, slit along the lower side 62b of the antenna coil), a region 62s without a slit may be provided. As there is a risk that a part of a conductor 61 overlapped with an opening 62h of the antenna coil 62 may be separated if there are slits at four sides. However, as an antenna device 70 illustrated in FIG. 3C, when coating a conductor 71 by resin or the like, there is no risk that the conductor 71 inside of an antenna coil 72 will be separated, so slit may be formed in all of four sides of an upper side 72a, a lower side 72b, a left side 72c and a right side 72d of the antenna coil 72.

Figures 6A, 6B, 6C:
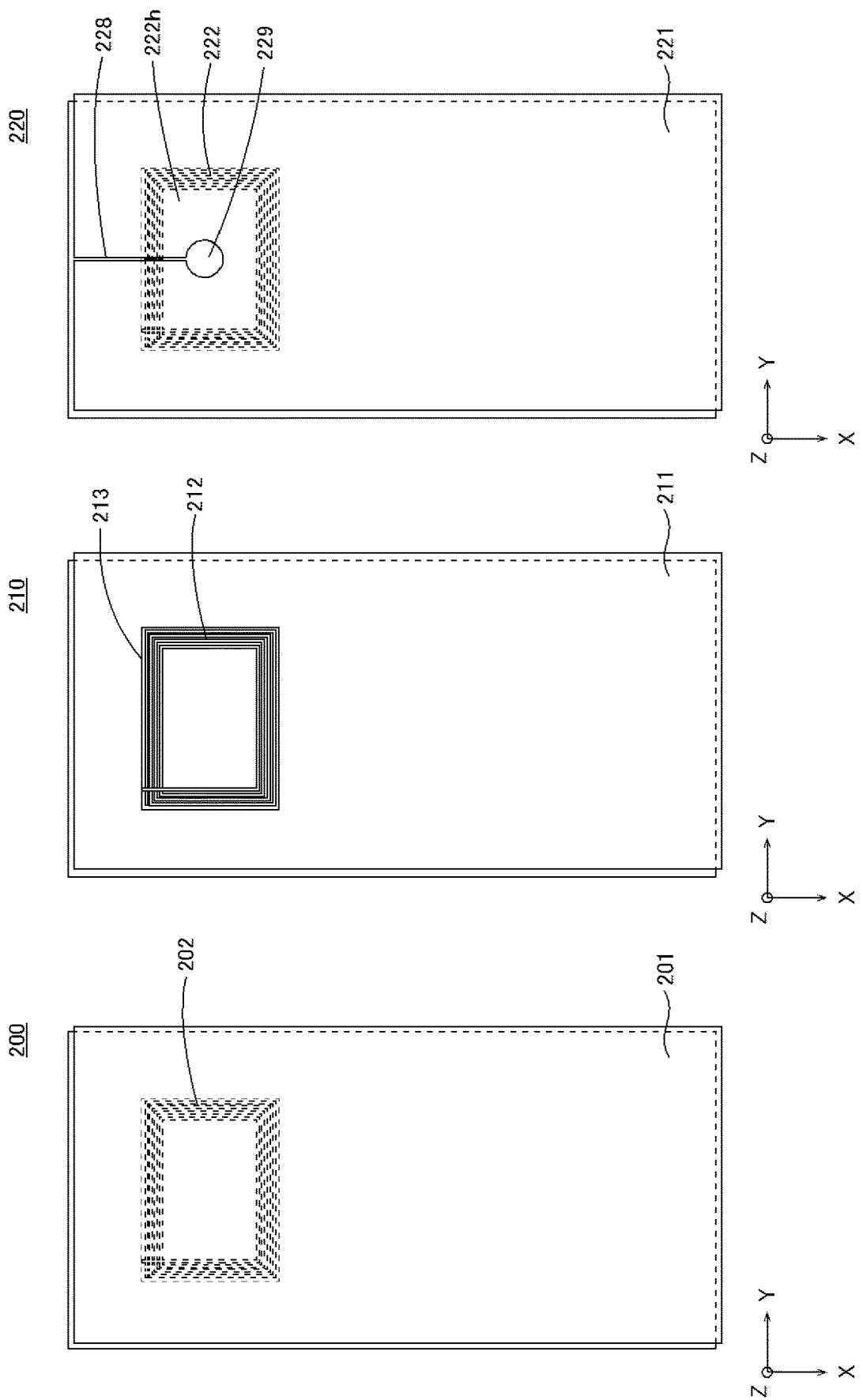
FIGS. 6A, 6B and 6C are plan views for explaining a configuration in an antenna device of comparative examples.

When forming the second slit 69 along four sides of inner shape of the opening 62h of the antenna coil 62 as in FIG. 3B, as illustrated in following examples, it is possible to obtain more excellent communication characteristics than communication characteristics when the circular opening is provided in the conductor (refer to FIG. 6C). Therefore, configuration illustrated in FIG. 3B (or FIG. 3C) is particularly preferable as the second slit.

As such, in the antenna device relating to one embodiment of the present invention, it is particularly preferable to form the second slit along inner shape of the antenna coil. Here, inner shape of the antenna coil means a boundary portion between the antenna coil and the opening of the antenna coil. By forming the second slit along inner shape of the antenna coil, magnetic flux passes through the slit formed along the opening of the antenna coil, so communication characteristics will be excellent. In addition, it is possible to increase a freedom of designing of the metallic cover or the like, as there is no need to make large opening in the conductor.

In the above, it was explained about preferred shapes of the second slit, but in the antenna device relating to one embodiment of the present invention, it is possible to configure as various shapes other than the above preferred shapes. In below, explaining about the other possible embodiments in FIGS. 4A to 4C, FIGS. 5A and 5B. In addition, in an antenna device mentioned in below, a shape of an antenna coil is not limited to approximately rectangular shape, and for example, it may be the antenna coil of polygonal shape such as hexagon or octagon, circular shape, or elliptical shape with curved inner shape.

In an antenna device 110, 120, 130 relating to one embodiment of the present invention, for example in FIG. 4A, a second slit 119 is formed along upper side 112a of inner shape of an antenna coil 112. In addition, as illustrated in FIG. 4B, a second slit 129 may be formed in a region between an upper side 122a and a lower side 122b of an antenna coil 122, and also, as illustrated in FIG. 4C, a second slit 139 may be formed along a lower side 132b of inner shape of an antenna coil 132. By a formed position of a second slit, a position through which magnetic flux passes will be different, so it is possible to adjust the formed position of the second slit, for example by a position of communication with the external device 40.

In addition, in an antenna device 140 relating to one embodiment of the present invention, as illustrated in FIG. 5A, a first slit 148 may be formed in y axis direction to pass through a left side 142c of an antenna coil 142, and for example, a first slit may be formed obliquely. And, as illustrated in FIG. 5A, a second slit 149 may be formed in a region between the left side 142c and a right side 142d of the antenna coil 142, or a second slit may be formed along the left side 142c or the right side 142d of inner shape of the antenna coil 142. In addition, as illustrated in FIG. 5B, in an antenna device 150 relating to one embodiment of the present invention, a second slit 159 may be formed to intersect with a first slit 158.

Examples

A function and effect of forming a first slit and a second slit with some configurations to a conductor 11 overlapped with an antenna coil 12 in an antenna device 1 relating to one embodiment of the present invention have been verified using the following examples 1 to 3 and comparative examples 1 to 4.

As example 1, the antenna device 60 illustrated in FIG. 3B, in which the second slit 69 was formed along four sides of inner shape of the opening 62h of the antenna coil 62, was used. As example 2, the antenna device 50 illustrated in FIG. 3A, in which the second slit 59 was formed along three sides of inner shape of the opening 52h of the antenna coil 52, was used. As example 3, the antenna device 130 illustrated in FIG. 4C, in which the second slit 139 was formed along one side of inner shape of the opening 132h of the antenna coil 132, was used.

In addition, as comparative example 1, an antenna device which does not have a conductor (metallic cover) was used. As comparative example 2, an antenna device 200 illustrated in FIG. 6A, which is having a conductor 201 (metallic cover) in which no opening or slit was formed, was used. As comparative example 3, an antenna device 210 illustrated in FIG. 6B, which was provided with an opening 213 approximately equal to outer shape of an antenna coil 212, was used. As comparative example 4, an antenna device 220 illustrated in FIG. 6C, which is having a circular opening 229 at approximately center of a region of a conductor 221 overlapped with an opening 222h of an antenna coil 222 and a slit 228 formed from the circular opening 229 to an end of the conductor 221 (metallic cover), was used.

In examples 1 to 3 and comparative examples 1 to 4, four-winding antenna coil measuring 40 mm×30 mm×0.3 mm was used. In addition, a thickness of a conductor (metallic cover) was 0.3 mm, a width of each slit was 0.5 mm, and a diameter of the circular opening in comparative example 4 was 10 mm. In example 1, among the slit along four sides, there is a region without a slit in a width of 1 mm at one side (refer to FIG. 3B).

Figure 7A:
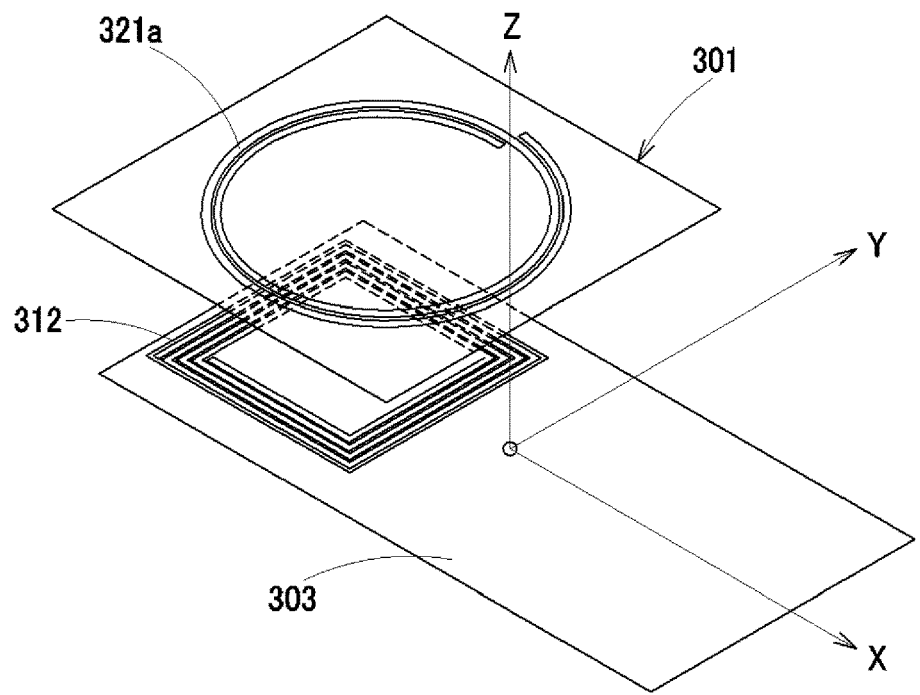
FIG. 7A is a perspective view and FIG. 7B is a plan view for explaining an evaluation method for confirming a function and effect of the antenna device relating to one embodiment of the present invention.
Figure 7B:
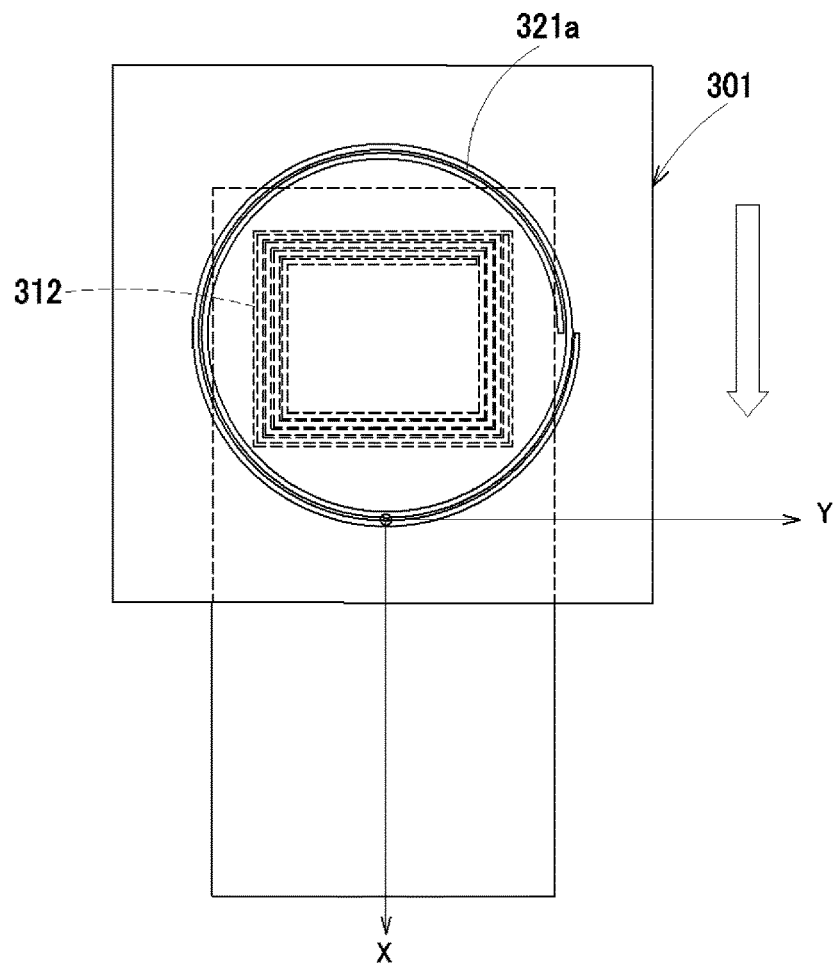

FIG. 7A is a perspective view and FIG. 7B is a plan view for explaining an evaluation method for confirming a function and effect of the antenna device relating to one embodiment of the present invention. As illustrated in FIGS. 7A and 7B, coupling coefficient when opposing reader/writer was moved to a predetermined direction was found by simulation for each of examples 1 to 3 and comparative examples 1 to 4.

A concrete evaluation conditions were set as follow. In other words, an antenna 301 of a reader/writer was a double-winding coil 321a with 70 mm of an outer diameter defined by x and y axis directions. The antenna 301 of reader/writer was opposed to each antenna device of examples 1 to 3 and comparative examples 1 to 4, and as illustrated in FIG. 7B, the antenna 301 of reader/writer was moved to x axis direction, and it was evaluated about communication characteristics (coupling coefficient k) at the time of change of a relative position relation of an antenna coil 312 of an antenna device and the antenna coil 321a of the reader/writer. In addition, a distance between the antenna coil 312 of the antenna device and the antenna coil 321a of the reader/writer defined by z axis direction was 45 mm.

Figure 8:
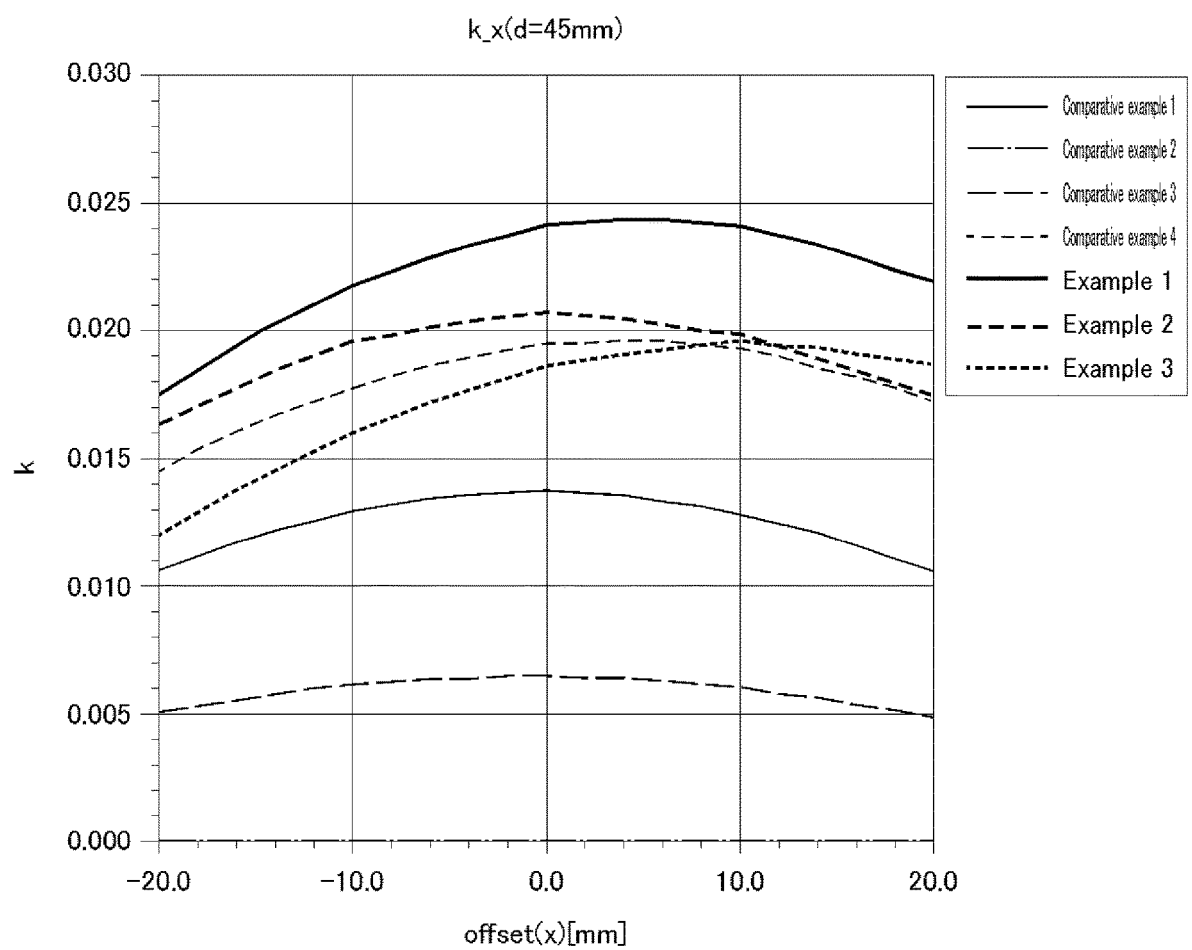
FIG. 8 is a graph illustrating an evaluation result of communication performance for confirming a function and effect of the antenna device relating to one embodiment of the present invention.

FIG. 8 is a graph illustrating an evaluation result of communication performance for confirming a function and effect of the antenna device relating to one embodiment of the present invention. In comparative example 1 as benchmark, coupling coefficient k was changed in a range of 0.010 to 0.014. In comparative example 2, it was not able to communicate as whole surface was covered by a metallic cover, so coupling coefficient k was kept as 0. In comparative example 3, it was having communication characteristics worse than communication characteristics of the comparative example 1 as benchmark, as first slit was not formed even though an opening was formed. In addition, in comparative example 4 having a first slit and a circular opening, it was having more excellent communication characteristics than comparative example 1.

In example 1, the second slit was formed along four sides of inner shape of the antenna coil, and it was having most excellent communication characteristics among examples 1 to 3 and comparative examples 1 to 4. Therefore, the antenna device relating to one embodiment of the present invention can achieve excellent communication characteristics even when large opening is not provided in a conductor.

In addition, about example 2 in which the second slit was formed along three sides of inner shape of the antenna coil and example 3 in which the second slit was formed along one side of inner shape of the antenna coil, they were also having more excellent communication characteristics than comparative example 4, or they were having communication characteristics equal to comparative example 4. In addition, in example 3, a peak was deviated to positive direction of x axis, as the second slit was formed along a lower side of the antenna coil. In this way, the antenna device relating to one embodiment of the present invention is also excellent in strength, as it is not necessary to provide an opening in a conductor, and also, it is possible to achieve the antenna device having excellent communication characteristics and with little limitation in design.

GLOSSARY OF DRAWING REFERENCES 1, 50, 60, 70, 110, 120, 130, 140, 150, 200, 210, 220 Antenna device
2 Antenna module
3 Antenna substrate
10 Portable terminal
11, 51, 61, 71, 111, 121, 131, 141, 151, 201, 211, 221 Conductor
12, 52, 62, 72, 112, 122, 132, 142, 152, 202, 212, 222 Antenna coil
12a Conducting wire
12b Opening
13 Communication processing unit
14 Terminal area
15 Battery pack
16 Printed circuit board
17 SIM slot
18, 58, 68, 78, 118, 128, 138, 148, 158 First slit
19, 59, 69, 79, 119, 129, 139, 149, 159 Second slit
30 Electronic apparatus
40 External device (Reader/writer)
41 Antenna
42 Control board
43 Control circuit
52a, 62a, 72a, 112a, 122a, 132a, 142a Upper side
52b, 62b, 72b, 112b, 122b, 132b, 142b Lower side
52c, 62c, 72c, 112c, 142c Left side
52d, 62d, 72d, 112d, 142d Right side
52h, 62h, 72h, 112h, 132h, 222h Opening
62s Region without slit
100 Wireless communication system
213, 229 Opening of conductor
228 Slit
301 Antenna of reader/writer
312 Antenna coil of antenna device
321a Antenna coil of reader/writer

The invention claimed is:

1. An antenna device incorporated in an electronic apparatus and communicating with an external device via an electromagnetic field signal, comprising:
   an antenna coil inductively coupled to the external device and provided by winding a conducting wire two dimensionally around an opening; and
   a conductor provided to be overlapped with the antenna coil at a surface of the antenna coil opposing the external device, wherein:
   the conductor comprises:
      a first slit formed from a region overlapped with the opening of the antenna coil to an end of the conductor; and
      a second slit connected to the first slit and formed in the region overlapped with the opening of the antenna coil;
   the opening of the antenna coil has a rectangular shape;
   the second slit is formed along four sides of the inner shape of the antenna coil; and
   among the second slit of four sides, in one of the four sides, a region without a slit is provided.

2. The antenna device according to claim 1, wherein the second slit is formed from a plurality of slits.

3. The antenna device according to claim 2, wherein the second slit being formed from a plurality of slits is formed along at least three sides of the inner shape of the antenna coil.

* * * * *